US012602499B2

(12) United States Patent
Calo et al.

(10) Patent No.: US 12,602,499 B2
(45) Date of Patent: Apr. 14, 2026

(54) DATA ACCESS UNDER REGULATORY CONSTRAINTS

(71) Applicant: International Business Machines Corporation, Armonk, NY (US)

(72) Inventors: Seraphin Bernard Calo, Yorktown Heights, NY (US); Dinesh C. Verma, New Castle, NY (US); Nirmit V. Desai, Yorktown Heights, NY (US); Douglas M. Freimuth, Yorktown Heights, NY (US); Anshu Kak, Englewood Cliffs, NJ (US); Tova Roth, Yorktown Heights, NY (US); Steven A Waite, Racine, WI (US); Roger Hollander, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 18/093,915

(22) Filed: Jan. 6, 2023

(65) Prior Publication Data

US 2024/0232407 A1    Jul. 11, 2024

(51) Int. Cl.
*G06F 21/62*        (2013.01)
*H04L 9/40*         (2022.01)

(52) U.S. Cl.
CPC ...... *G06F 21/6218* (2013.01); *H04L 63/0281* (2013.01); *H04L 63/107* (2013.01); *H04L 63/20* (2013.01)

(58) Field of Classification Search
None
See application file for complete search history.

(56) References Cited

U.S. PATENT DOCUMENTS 9,813,343 B2    11/2017  Williams et al.
11,082,334 B2    8/2021  Parasmal et al.
(Continued)

FOREIGN PATENT DOCUMENTS

CN        112565473 A  *  3/2021  .......... H04L 61/4511

OTHER PUBLICATIONS

Shabani, Blockchain-based platforms for genomic data sharing: a de-centralized approach in response to the governance problems?, Journal of the American Medical Informatics Association, 26(1), 2019, 76-80 doi: 10.1093/iamia/ocy149, Advance Access Publication Date: Nov. 28, 2018, Perspective.
(Continued)

*Primary Examiner* — Ali H. Cheema
(74) *Attorney, Agent, or Firm* — Aaron N. Pontikos

(57) ABSTRACT

Method, apparatus and computer program product for accessing data based on regulatory constraints is described herein. In an implementation, the method includes receiving, via a proxy located in a first geographic jurisdiction, a request for data from a software program, wherein the data is stored in a database located in a second geographic jurisdiction, identifying a regulatory constraint that must be enforced on the data stored in the database in the second geographic jurisdiction based on a policy associated with the second geographic jurisdiction, retrieving, via the proxy in the first geographic jurisdiction, the data requested from a proxy located in the second geographic jurisdiction, delivering the data received from the proxy located in the second geographic jurisdiction to the software program, and executing, via the proxy in the first geographic jurisdiction, an additional action on the data to comply with the regulatory constraint of the second geographic jurisdiction.

20 Claims, 17 Drawing Sheets

(56)                    References Cited

U.S. PATENT DOCUMENTS

| | | | | |
|---|---|---|---|---|
| 11,310,225 | B2 | 4/2022 | Aiello et al. | |
| 11,394,710 | B1 | 7/2022 | Royal et al. | |
| 2010/0318608 | A1* | 12/2010 | Huang | G06F 9/45558 |
| | | | | 718/1 |
| 2014/0068778 | A1* | 3/2014 | Bhatia | H04L 63/107 |
| | | | | 726/26 |
| 2014/0122580 | A1* | 5/2014 | Nuaimi | H04L 63/0281 |
| | | | | 709/203 |
| 2015/0254216 | A1* | 9/2015 | DeLuca | G06F 40/134 |
| | | | | 715/206 |
| 2016/0308765 | A1* | 10/2016 | Le | H04L 45/70 |
| 2018/0337993 | A1* | 11/2018 | Kumar Kasturi | H04L 69/14 |
| 2019/0379754 | A1* | 12/2019 | Krishnaswamy | H04L 67/289 |
| 2020/0036788 | A1* | 1/2020 | Zhang | H04L 67/1097 |
| 2021/0029395 | A1* | 1/2021 | Jackson | H04N 21/2187 |
| 2021/0336935 | A1* | 10/2021 | Keiter | H04L 63/107 |
| 2024/0015162 | A1* | 1/2024 | Singh | G06F 21/10 |
| 2024/0104074 | A1* | 3/2024 | Cember | G06F 16/2219 |

OTHER PUBLICATIONS

Voisin et al., Cell Genomics GA4GH Passport standard for digital identity and access permissions, Cell Genomics 1, 100030, Nov. 10, 2021, https://soi.org.10.1016/j.sgen.2021.100030.

Vulimiri, Global Analytics in the Face of Bandwidth and Regulatory Constraints, This paper is included in the Proceedings of the 12th USENIX Symposium on Networked Systems Design and Implementation (NSDI '15, May 4-6, 2015 • Oakland, CA, USA, ISBN 978-1-931971-218.

* cited by examiner

100

150

154C

154N

160

162

154A

154B

210

300

CERTIFICATE AUTHORITY 316

PROCESSING PLATFORM 318

DATA SOURCE 312

BLOCKCHAIN USER 302

NODE 314

NODE 314

NODE 314

NODE 314

NODE 314

Permissioned Blockchain 304

REGULATOR 306

BLOCKCHAIN DEVELOPER 310

BLOCKCHAIN NETWORK OPERATOR 308

370
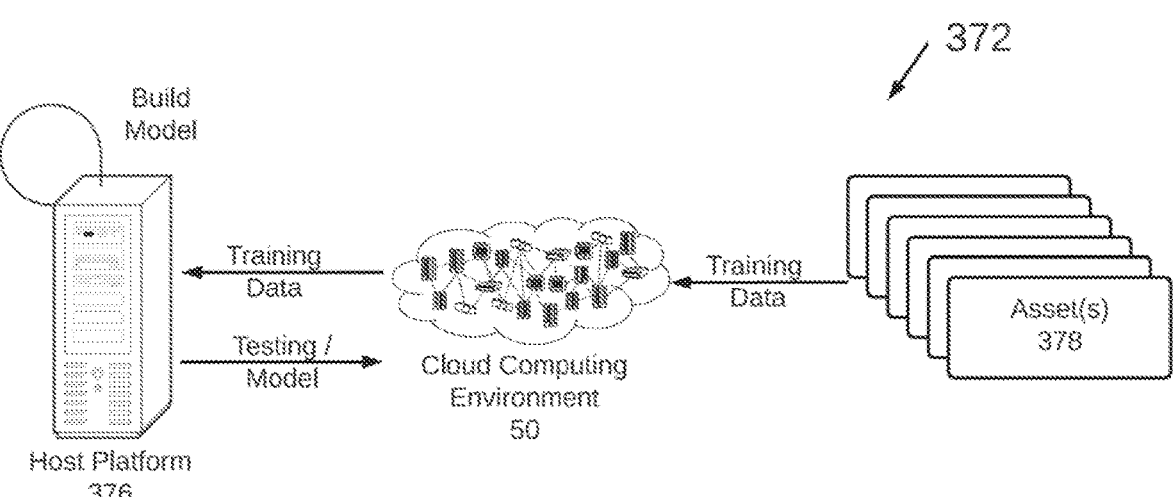
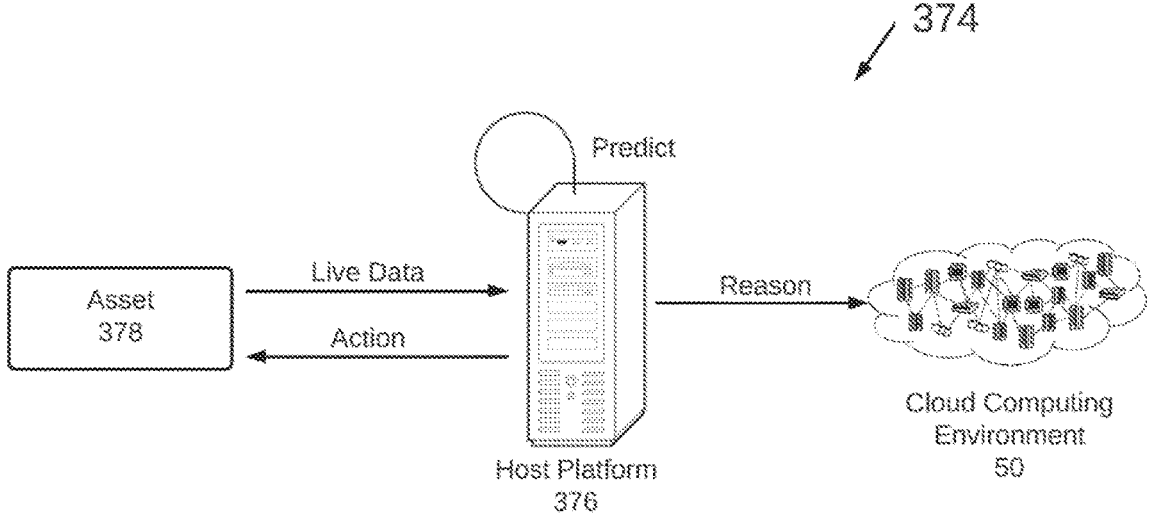
FIG. 3D

Jurisdictional Boundary

Software Application 420

Data Request

Policy DB 414

Proxy 412

Detect Jurisdiction

Target DB 410

(Target Jurisdiction)

Figure 4B:
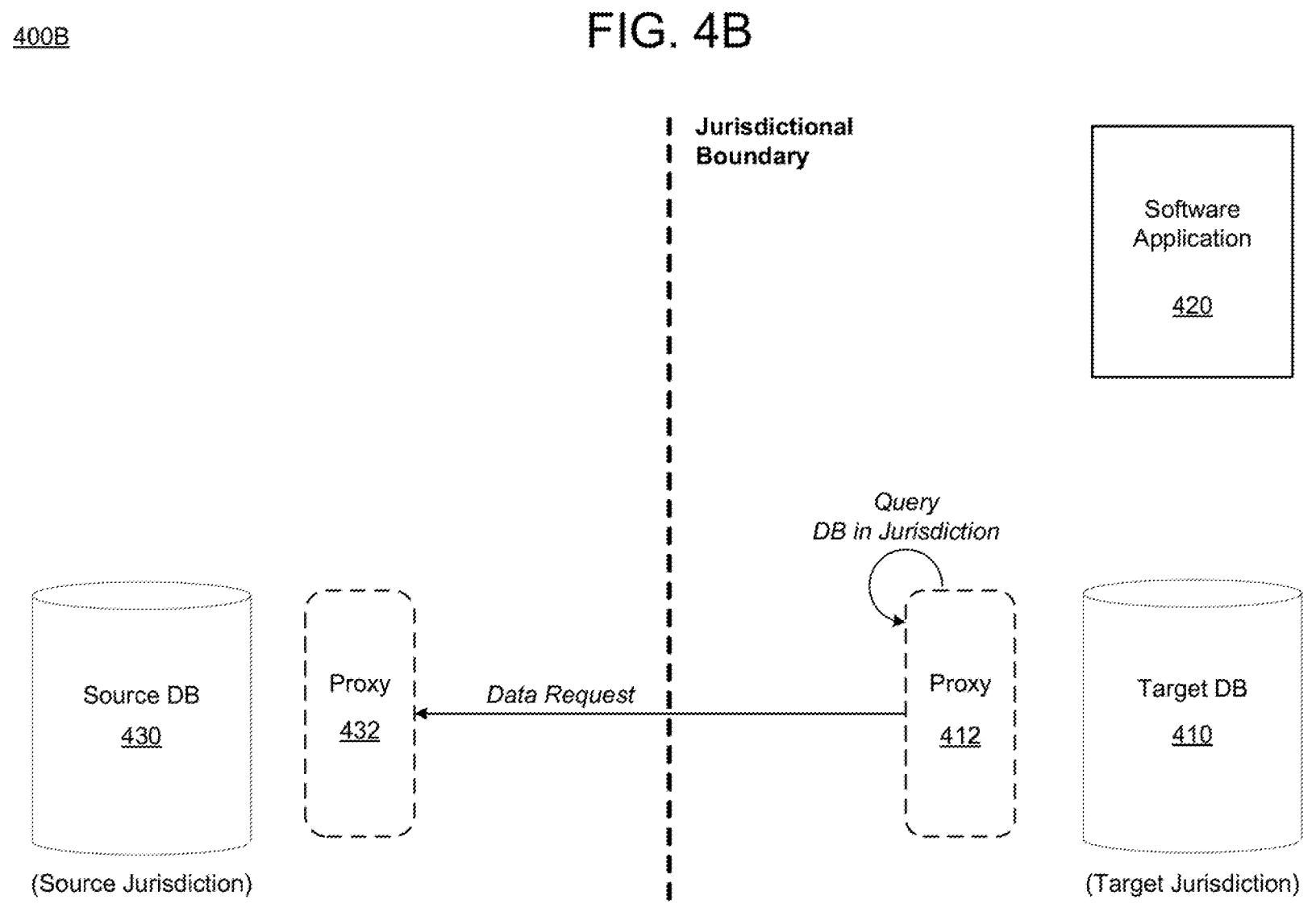

Jurisdictional Boundary

Software Application
420

Target DB
410

(Target Jurisdiction)

Query
DB in Jurisdiction

Proxy
412

Data Request

Proxy
432

Source DB
430

(Source Jurisdiction)

Figure 4C:
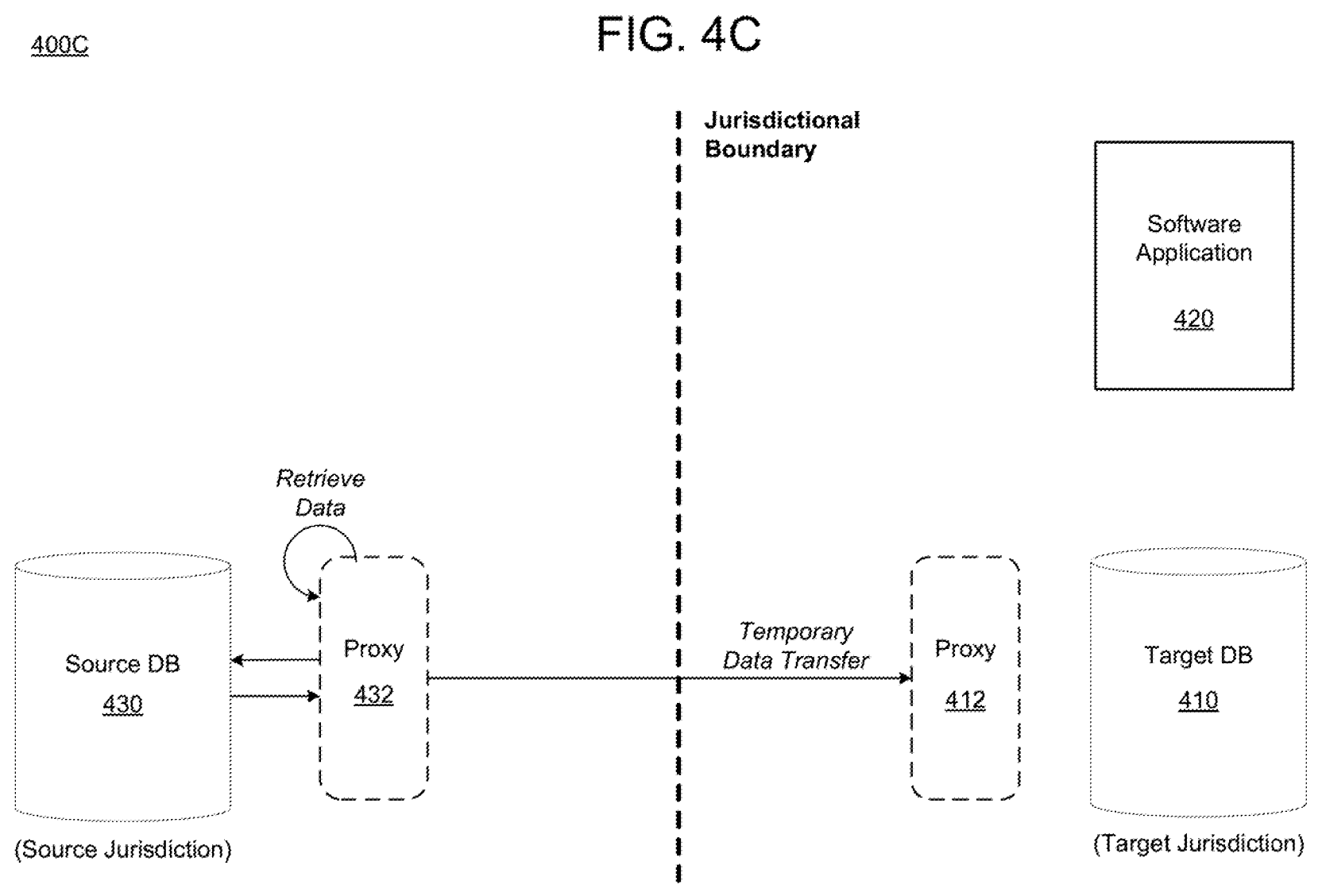

Jurisdictional
Boundary

Software
Application
420

Target DB
410

(Target Jurisdiction)

Proxy
412

Temporary
Data Transfer

Retrieve
Data

Proxy
432

Source DB
430

(Source Jurisdiction)

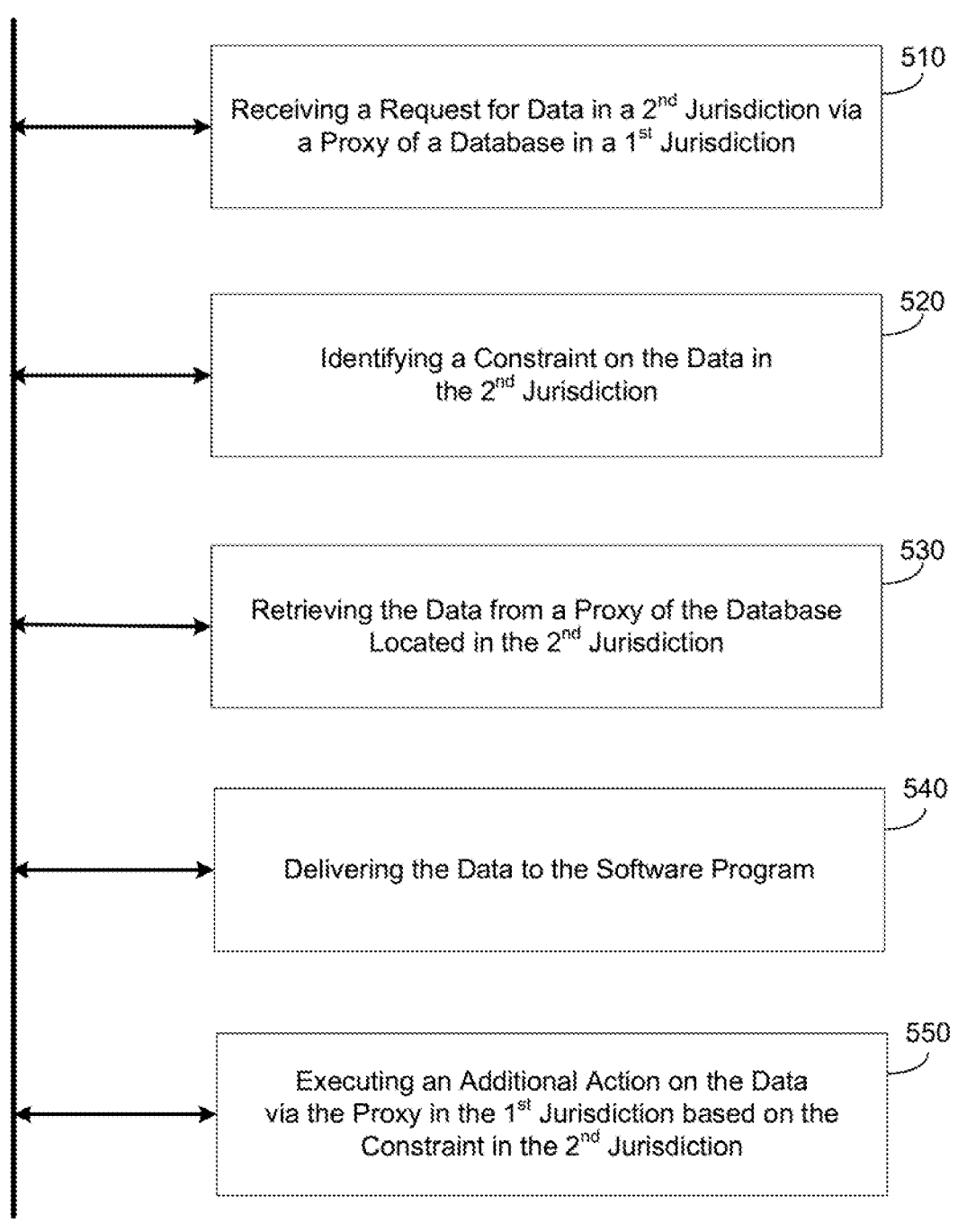

Receiving a Request for Data in a 2nd Jurisdiction via a Proxy of a Database in a 1st Jurisdiction — 510

Identifying a Constraint on the Data in the 2nd Jurisdiction — 520

Retrieving the Data from a Proxy of the Database Located in the 2nd Jurisdiction — 530

Delivering the Data to the Software Program — 540

Executing an Additional Action on the Data via the Proxy in the 1st Jurisdiction based on the Constraint in the 2nd Jurisdiction — 550

600

DATA ACCESS UNDER REGULATORY CONSTRAINTS

BACKGROUND

Financial services often operate on data located in countries different from the one in which they have a processing center. Certain countries have regulations which restrict the use and storage of personal information of its citizens, which must be upheld. This requirement remains even when the data is needed in a different country such as a country which does not have such regulations. Movement of personal data across international borders and storage of data in foreign countries may be tightly controlled, and only be allowed for certain purposes or for limited periods of time. One way of dealing with such situations is to replicate processing capabilities in each separate country. However, this solution is extremely expensive and difficult to manage. Each environment may require different computing platforms because of differing transaction rates and cost of equipment, and it is difficult and costly to rewrite legacy applications on new platforms.

SUMMARY

One example embodiment provides an apparatus that may include a processor configured to receive, via a proxy located in a first geographic jurisdiction, a request for data from a software program, wherein the data is stored in a database located in a second geographic jurisdiction, identify a regulatory constraint that must be enforced on the data stored in the database in the second geographic jurisdiction based on a policy associated with the second geographic jurisdiction, retrieve, via the proxy in the first geographic jurisdiction, the data requested from a proxy located in the second geographic jurisdiction, deliver the data received from the proxy located in the second geographic jurisdiction to the software program, and execute, via the proxy in the first geographic jurisdiction, an additional action on the data to comply with the regulatory constraint of the second geographic jurisdiction.

Another example embodiment provides a method that may include one or more of receiving, via a proxy located in a first geographic jurisdiction, a request for data from a software program, wherein the data is stored in a database located in a second geographic jurisdiction, identifying a regulatory constraint that must be enforced on the data stored in the database in the second geographic jurisdiction based on a policy associated with the second geographic jurisdiction, retrieving, via the proxy in the first geographic jurisdiction, the data requested from a proxy located in the second geographic jurisdiction, delivering the data received from the proxy located in the second geographic jurisdiction to the software program, and executing, via the proxy in the first geographic jurisdiction, an additional action on the data to comply with the regulatory constraint of the second geographic jurisdiction.

A further example embodiment provides a computer-readable medium comprising instructions, that when read by a processor, cause the processor to perform one or more of receiving, via a proxy located in a first geographic jurisdiction, a request for data from a software program, wherein the data is stored in a database located in a second geographic jurisdiction, identifying a regulatory constraint that must be enforced on the data stored in the database in the second geographic jurisdiction based on a policy associated with the second geographic jurisdiction, retrieving, via the proxy in the first geographic jurisdiction, the data requested from a proxy located in the second geographic jurisdiction, delivering the data received from the proxy located in the second geographic jurisdiction to the software program, and executing, via the proxy in the first geographic jurisdiction, an additional action on the data to comply with the regulatory constraint of the second geographic jurisdiction.

BRIEF DESCRIPTION OF THE DRAWINGS

FIG. 3D is a diagram illustrating machine learning process via a cloud computing platform according to an example embodiment.

FIGS. 4A-4F are diagrams illustrating a process of a database in a target geographic jurisdiction accessing data in a source geographic jurisdiction which is under different regulatory constraints according to example embodiments.

FIG. 5 is a diagram illustrating a method of access data that is controlled by regulatory constraints according to example embodiments.

DETAILED DESCRIPTION

Figure 1A:
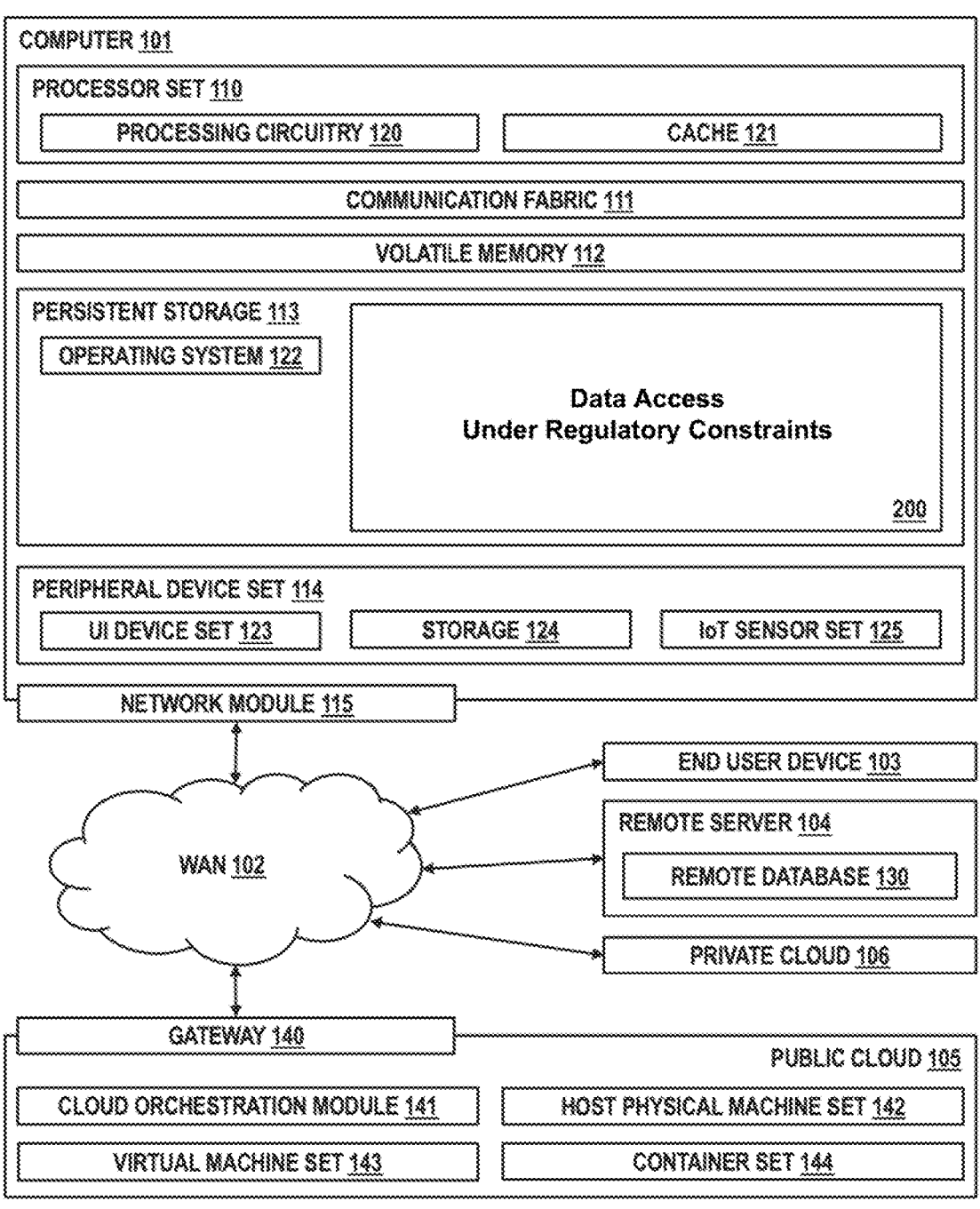
FIG. 1A is a diagram illustrating a computing environment according to an embodiment of the present invention.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Many financial services companies start their operations in one country and grow to support many other countries over the course of their operations. It is more convenient to manage the financial services from a single location such as a single country, which allows for easier maintenance, development and operations. The financial services operations would consist of one of more applications processing data maintained in one or more databases. However, other countries may impose requirements that data belonging to residents in that country be maintained within the boundaries of the country. This poses financial and technical challenges for companies who need to comply with these requirements and migrate from one country operation to multiple-country operations The example embodiments are directed to a data access technology that can satisfy regulatory requirements in a more efficient and less expensive manner than replicating software and other infrastructure in each potential geographical jurisdiction (e.g., country). Instead, a proxy layer can be added in front of each existing database among a network of databases. For example, when a software application coupled to a database in a first jurisdiction needs to access data from a database located in a second jurisdiction that is geographically different than the first jurisdiction and which enforces different regulations on the data, the proxies can ensure that the regulations are complied with.

For example, a proxy can sit in front of each of the databases used by the application and can enforce the regulatory requirements of each respective jurisdiction including policies that constrain data movement, location, retention, and any other regulations. If the data access is completed, the proxies can also ensure that data that should not be retained is destroyed or otherwise deleted from the target database thereby preventing any regulatory infractions. The example embodiments may be integrated into a cloud computing environment in which distributed systems and processing centers access data from an international environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1A, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart.

For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the inventive methods, such as in data access under regulatory constraints block 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1A. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block

200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth® connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi® signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi® network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 1B:
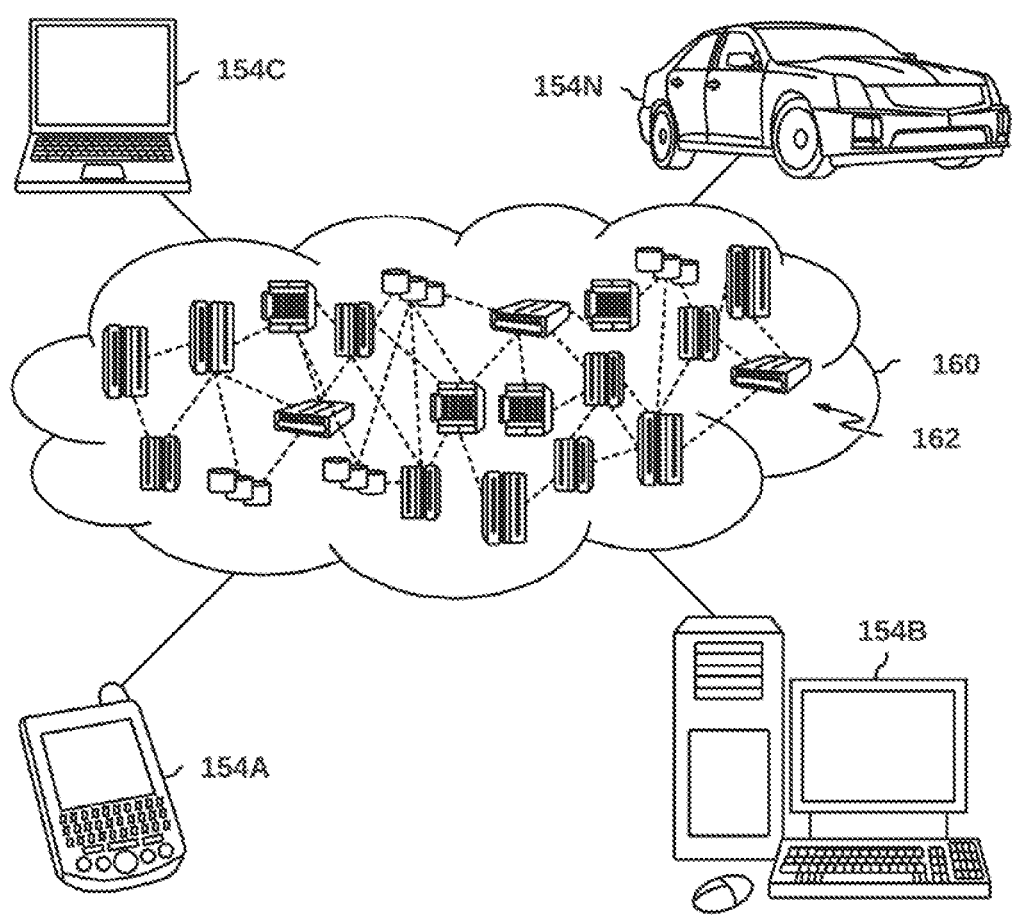
FIG. 1B is a diagram illustrating a cloud computing environment according to an example embodiment.

Referring now to FIG. 1B, an illustrative cloud environment 150 is depicted. As shown, cloud computing environment 160 includes one or more cloud computing nodes 162 with which local computing devices used by cloud consumers, such as, for example, personal digital assistant (PDA) or cellular telephone 154A, desktop computer 154B, laptop computer 154C, and/or automobile computer system 154N may communicate. Nodes 162 may communicate with one another. They may be grouped (not shown) physically or virtually in one or more networks, such as Private, Community, Public, or Hybrid clouds as described hereinabove, or a combination thereof. This allows cloud computing environment 160 to offer infrastructure, platforms and/or software as services for which a cloud consumer does not need to maintain resources on a local computing device. It is understood that the types of computing devices 154A-N shown in FIG. 1B are intended to be illustrative only and that computing nodes 162 and cloud computing environment 160 can communicate with any type of computerized device over any type of network and/or network addressable connection (e.g., using a web browser).

Figure 2A:
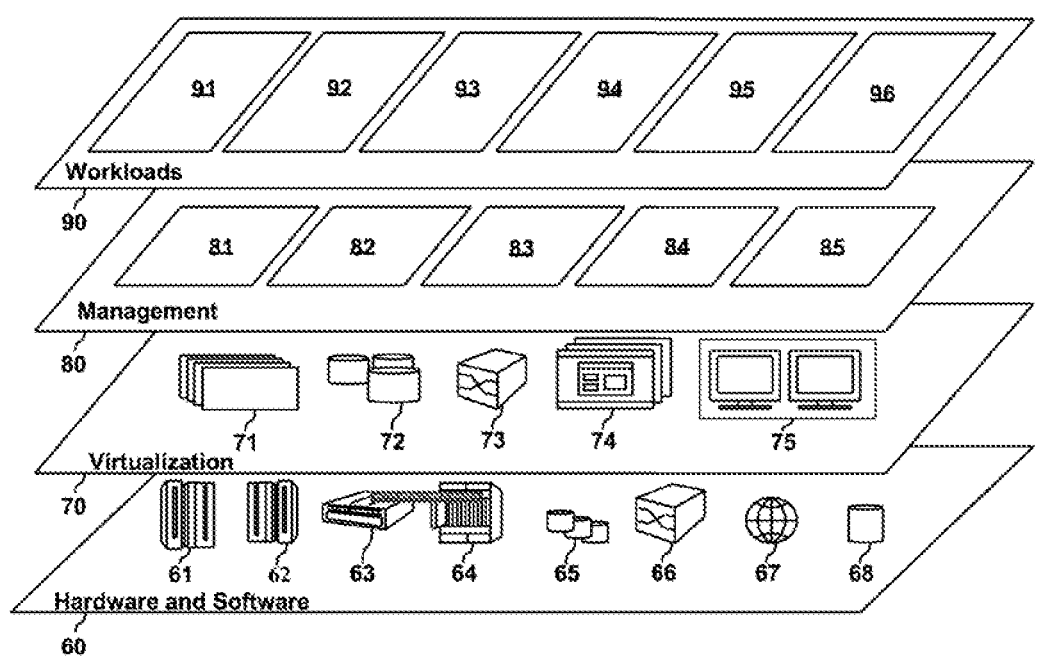
FIG. 2A is a diagram illustrating an example of abstraction model layers of a cloud platform according to an example embodiment.

Referring now to FIG. 2A, a set of functional abstraction layers 210 provided by cloud computing environment 160 (FIG. 1B) is shown. It should be understood in advance that the components, layers, and functions shown in FIG. 2A are intended to be illustrative only, and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment and billing or invoicing to consume these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data access under regulatory constraints processing 96.

Figure 2B:
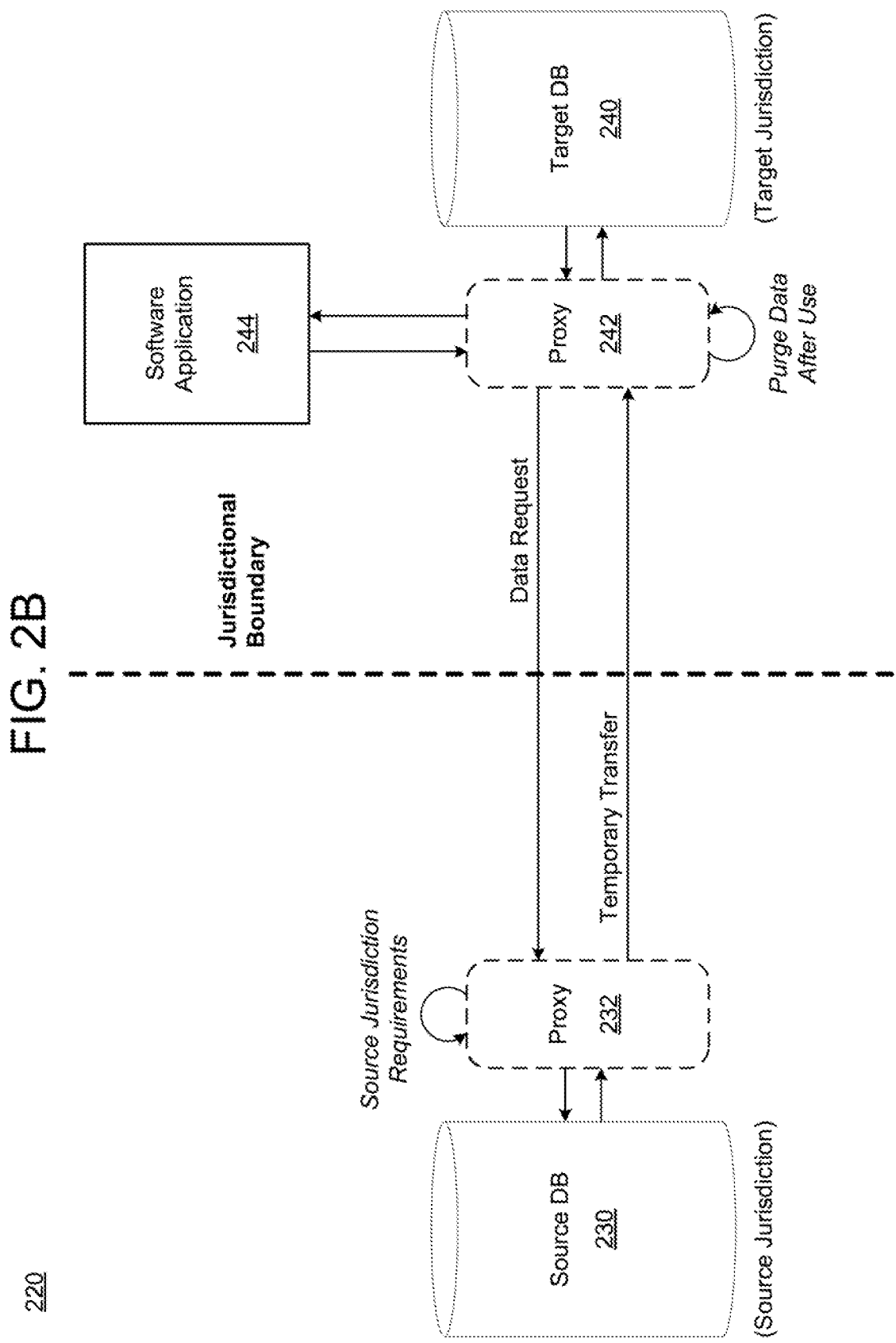
FIG. 2B is a diagram illustrating a process of accessing data under regulatory constraints according to example embodiments.

FIG. 2B illustrates a process 220 of access data that is held under regulatory constraints according to various embodiments. For example, the process 220 may be performed by a layer of proxies including proxy 232 and proxy 242 that carry out the data access under regulatory constraints processing 96 shown in FIG. 2A. The solution maintains processing centers and data processing applications in their existing locations geographically and creates a proxy layer that interfaces to the databases in the other geographical locations (e.g., other countries, etc.). The proxies can enforce policies about data movement, location, and retention that uphold the regulations of each of the countries involved.

Financial companies may need to extend their operations from serving a single country to being able to serve multiple countries. The systems used for implementation of the financial services can be complex and incorporate many types of applications. It is therefore expensive to replicate these systems in each separate country. However, many governments are specifying constraints on how personal data about their citizens can be processed and where it can be stored. As an example, consider a credit card transaction company which has implemented its credit card authorization, authentication, fraud-detection and other business process mechanisms and safeguards in Country B. The company is also offering credit card services in Country A, but that country has regulations requiring that the personal data of its citizens be maintained within their borders, cannot be permanently stored elsewhere, and can be processed in another country only if its use is temporary, it is expunged after use and information about how it has been used is logged back to the country of origin. These constraints can all be met by using a network of proxies according to various embodiments which affect remote access to data in Country A that is then processed in Country B. The proxies enforce policies that capture the data handling regulations of Country A. Thus, no replication or modification of applications is required. While the motivating example is that of a credit card company, the same approach can be used for international operations of any nature, financial or otherwise, and for any set of regulations. These operations may comprise credit card transactions, loan transactions, central bank digital currency processing, insurance transactions, international and domestic money transfers, and processing of crypto-currencies and non-fungible tokens implemented using blockchain networks.

In FIG. 2A, a target database 240 is coupled to a software application 244 for data processing such as financial processing of payment transactions, or the like. The target database 240 is located in a first geographic jurisdiction. The software application 244 may execute a transaction that requires data from a source database 230 that is disposed in a different geographic jurisdiction that enforces different and more severe regulations on the data stored at the source database 230. For example, regulations may prevent the data from being transferred to the jurisdiction of the target database 240 for more than a temporary period of time (e.g., 30 minutes, 1 hour, 1 day, etc.) after which the data must be purged. Another regulation may require that the use of the data in the target jurisdiction be logged/recorded in the database 230 stored in the source jurisdiction.

As an example, during execution of a data processing transaction via the software application 244, the software application 244 may query the target database 240 for a data record, value, table, column, etc., which is stored in the source database 230. The query may be received by a proxy 242 of the target database 240. The proxy 242 may detect the geographic location of the source jurisdiction based on the query from the software application 244. For example, the proxy 242 may detect a point of origin of a user that is part of the transaction being executed by the software application 244 and determine that the user is a citizen of the source jurisdiction. The point of origin may be detected from a value stored in the query such as a network address, a header, or the like. In response, the proxy 242 may identify a proxy 232 in the source jurisdiction that is paired with the source database 230 and query the proxy 232 for the data needed by the software application 244.

The proxy 232 and/or the proxy 242 may determine the data access policy of the source jurisdiction based on policy data stored within a memory of the proxy 232 and/or the proxy 242. Each proxy may be embedded with such policy information during install/deployment. In this example, the regulations prevent the data from being transferred for more than one hour. Here, the proxy 232 may determine that the data can be transferred on a temporary basis, and deliver the data to the proxy 242. In response, the proxy 242 can provide the data to the software application 244.

Furthermore, the proxy 242 can also ensure that the data from the source database 230 is purged in the target jurisdiction before the expiration of the time limit (e.g., 1 hour). For example, the proxy 242 may delete the data from the target database 240 and/or any data stored locally in the proxy 242 after it is done being used by the software application 244. As another example, the proxy 242 may start a timer (e.g., a time-to-live job, etc.) which is embedded with an identifier of the data request and wait until the timer expires after which the proxy 242 may delete the data from the source database 230. Any other necessary regulatory requirements can also be followed by the proxy 242 and/or the proxy 232 working together.

According to various embodiments, a network of federated databases can be used to provide visibility into the data that is required for the processing of each transaction to the computing site with all of the required applications. Processing does not move, and the applications do not need to be changed in any way, since the access to distributed data can be provided by proxies that mediate the data flow. These proxies also implement policies that enforce the regulations of the countries involved. The data only resides in the processing site while the transaction is being executed and storage of copies can be prohibited or limited to a short duration of time, based upon each country's requirements.

Details of the results of the transactions can also be sent back to the country from which the data was accessed, providing an audit trail for data usage.

The transaction requirements may be complicated. For example, a credit card holder from one country may be travelling in another country or may be buying products from a merchant in another country over the Internet. Further, the transaction authorization response may be provided at a low latency after a request is received and may involve data that is stored in many different databases. The proxy network described herein can support many different heterogeneous databases, providing an interface layer that can map from the formats of the stored data to the formats required by the applications processing the data. The technical challenge is in determining the data associated with each transaction, its location, and the relevant policies that apply.

In some embodiments, the application involved may include software components that rely on a blockchain ledger and a blockchain network. As another example, the application may include software components that use a quantum safe communication mechanism.

Figure 3A:
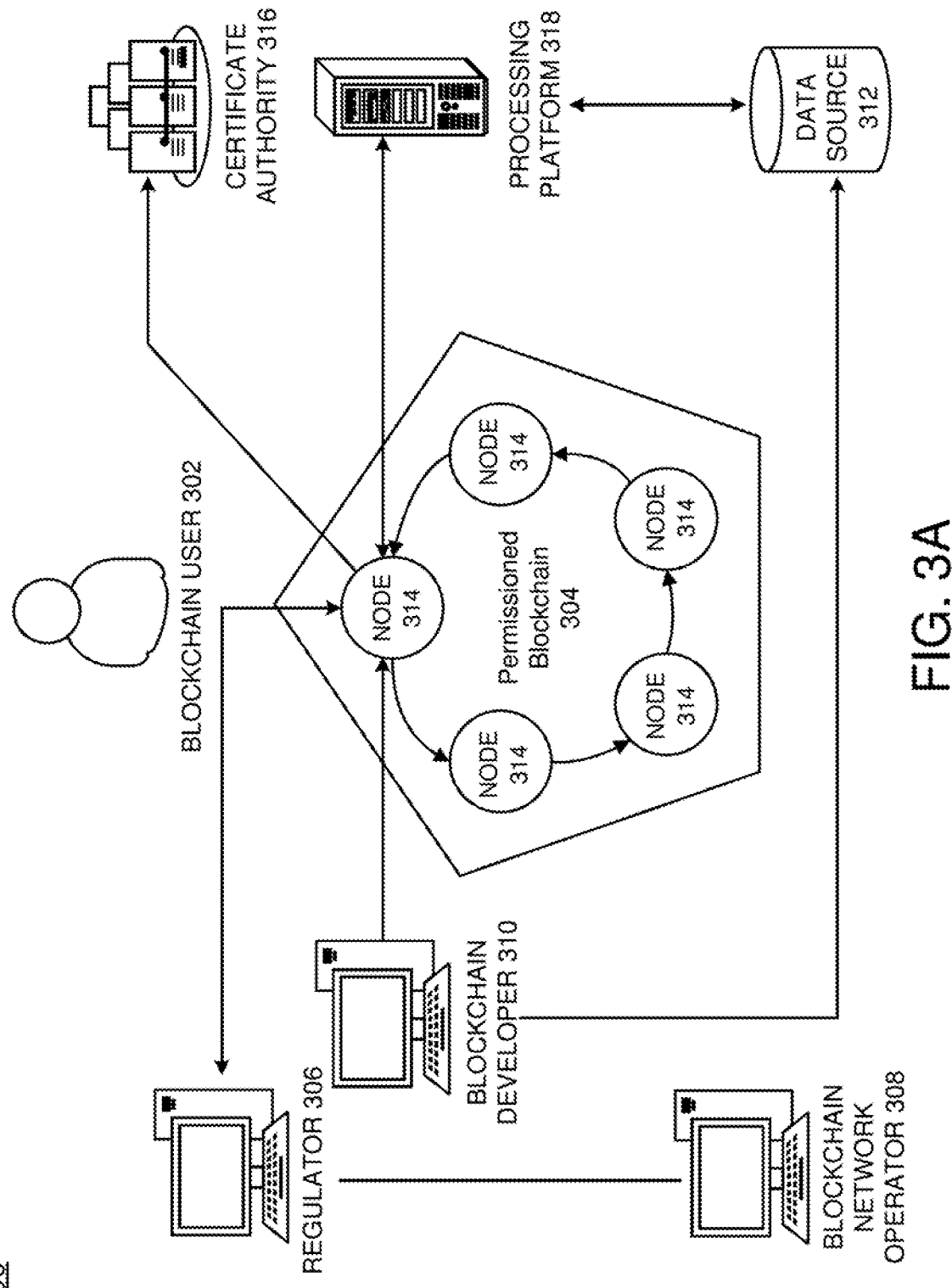
FIG. 3A is a diagram illustrating a permissioned network, according to example embodiments.

FIG. 3A illustrates an example of a permissioned blockchain network 300, which features a distributed, decentralized peer-to-peer architecture. The blockchain network may interact with the cloud computing environment 160, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
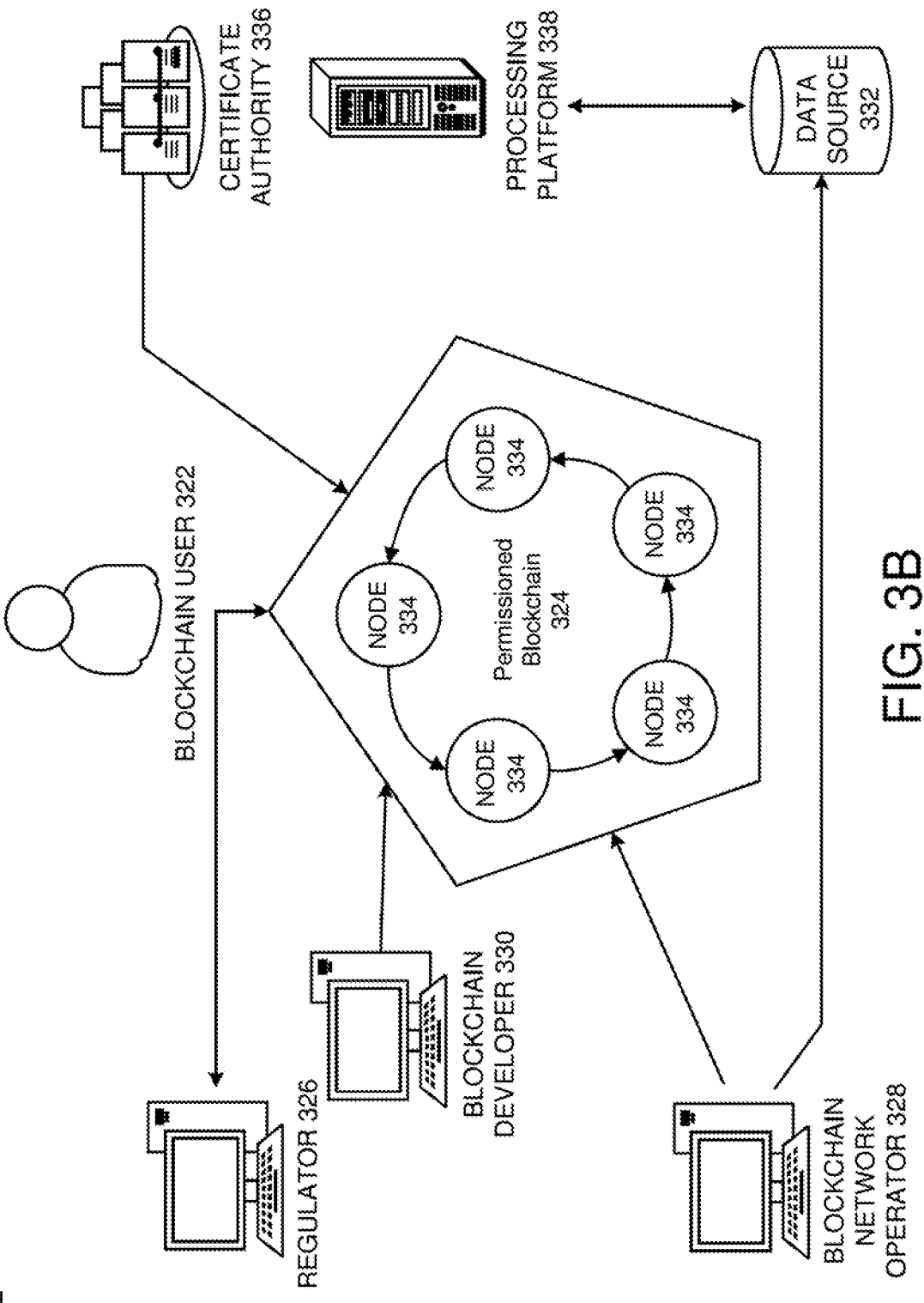
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain a user may create a personal address and begin interacting with the network by submitting transactions and hence adding entries to the ledger. Additionally, all parties have the choice of running a node on the system and employing the mining protocols to help verify transactions.

Figure 3C:
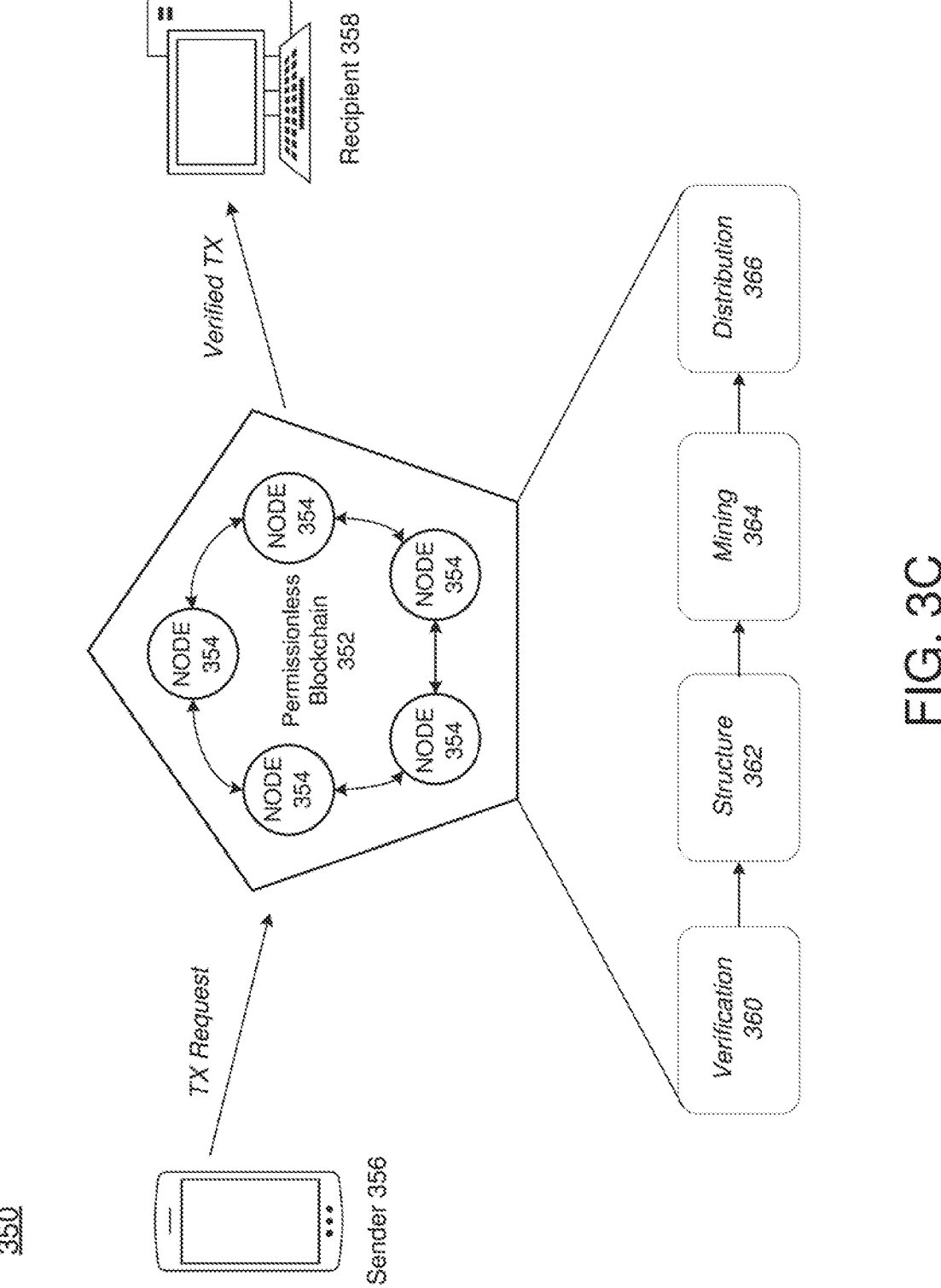
FIG. 3C is a diagram illustrating a further permissionless network, according to example embodiments.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender 356 and the recipient 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header.

Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of the recipient 358.

Figure 3E:
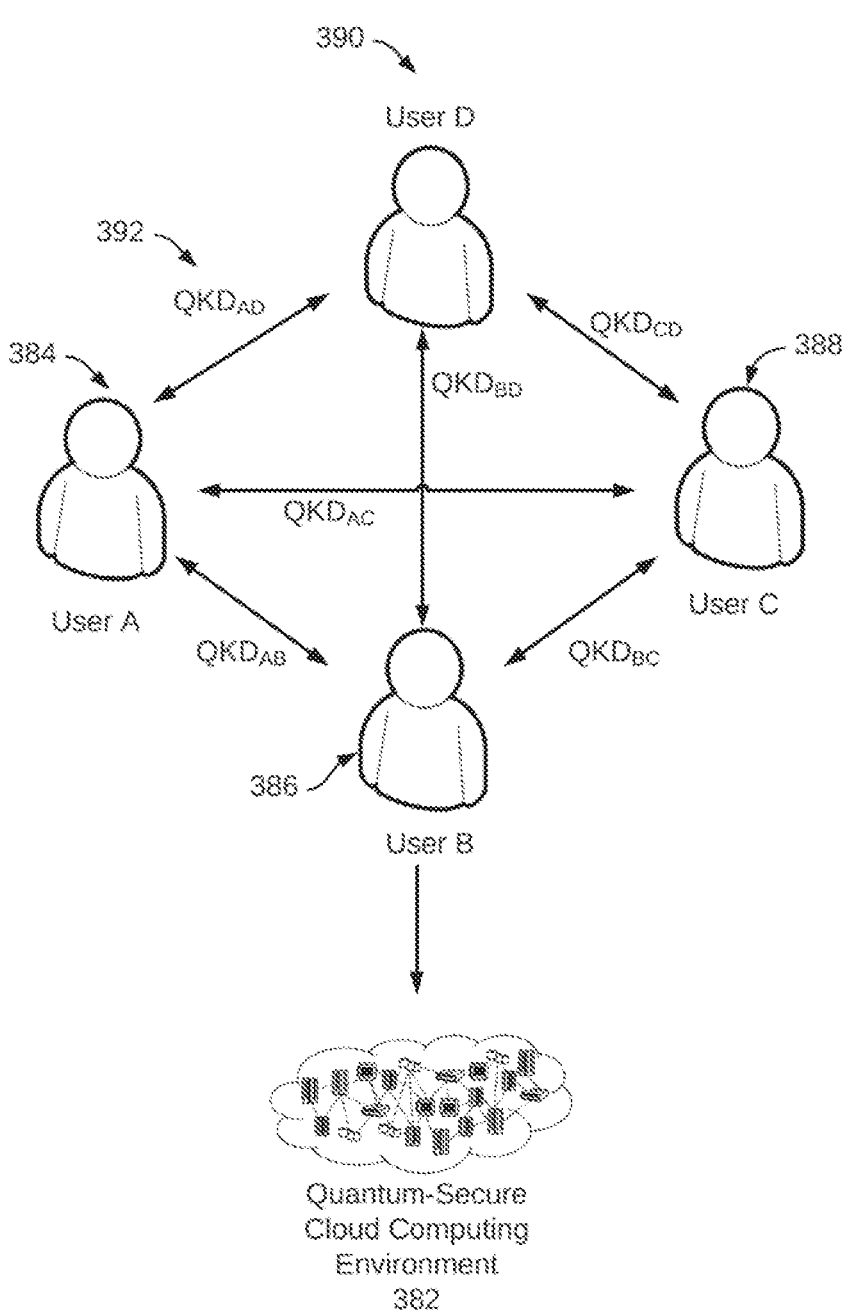
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 160, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 376 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 160 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 160. This can significantly reduce the collection time needed by the host platform 376 when performing predictive model training. For example, data can be directly and reliably transferred straight from its place of origin to the cloud computing environment 160. By using the cloud computing environment 160 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment 160 by the host platform 376. Each refinement of the machine learning model (e.g., changes in variables, weights, etc.) may be stored in the cloud computing environment 160 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 160.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment 160 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 160. In one embodiment, the features and/or the actions described and/or depicted herein can occur on or with respect to the cloud computing environment 160. In one embodiment, communication between different components of the solution may be secure using quantum key distribution (QKD) and quantum safe cryptographic communications.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

Figure 4A:
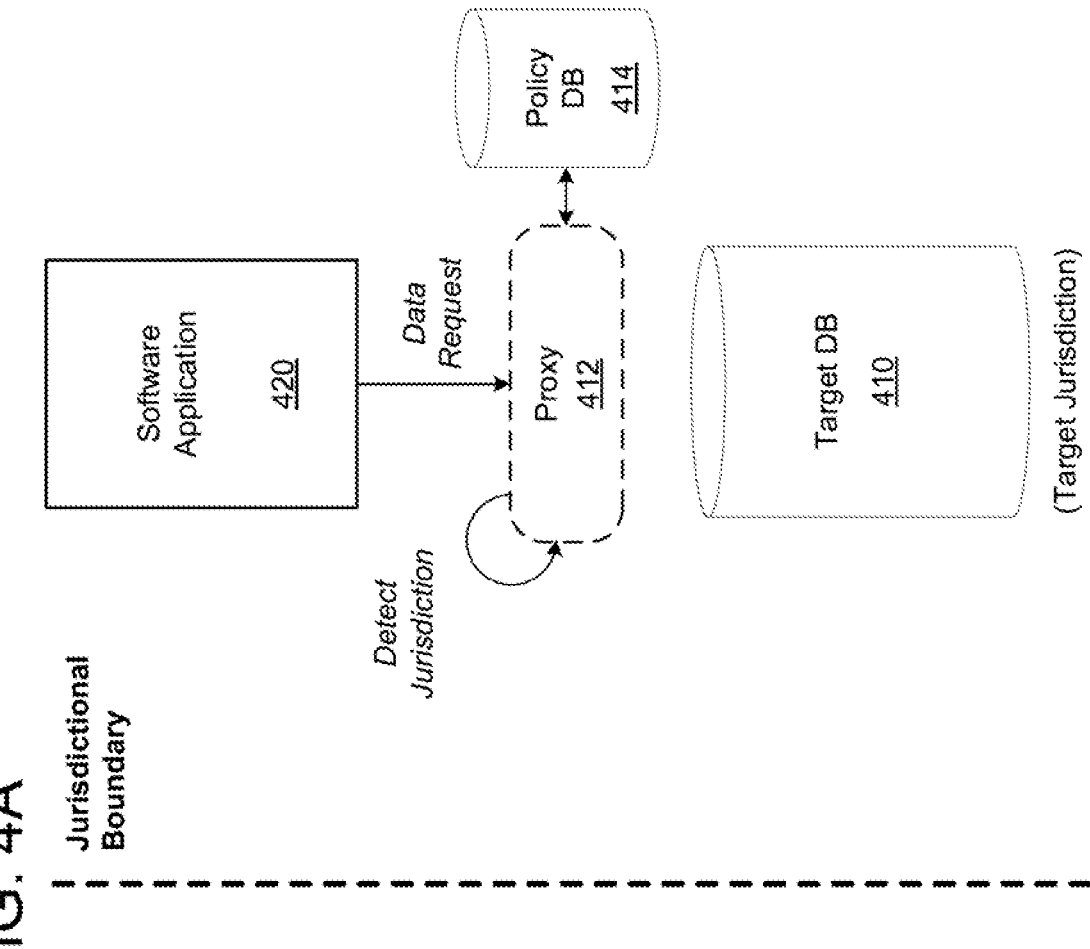

FIGS. 4A-4F illustrate a process of a target database 410 in a target geographic jurisdiction accessing data from a source database 430 in a source geographic jurisdiction which is under different regulatory constraints according to example embodiments. FIG. 4A illustrates a process 400A of a software application 420 querying the target database 410 for a data record of a user that is part of a data processing transaction. As an example, the software application 420 may be a payment processing application such as a payment processor that is coupled to an electronic payment network. The data needed by the software application 420 may be relevant to validating the funds of the user in their account, verifying an identity of the user, authenticating the user, and the like.

While the discussion has been shown in terms of a proxy in front of a respective database at each respective geographical jurisdiction, an application may consist of multiple databases within each respective geographical jurisdiction. There may be many proxies at each jurisdiction, one such proxy in front of each database. The proxies within all of the jurisdictions form a network of proxies. Within this network of proxies, a proxy that receives a request can provide hints related to the data needed by the request to another proxy within the same geographical jurisdiction or to a proxy in a different geographical jurisdiction. This mechanism can provide a proxy advance knowledge about requests that may be coming from the application after it processes the request.

There are a number of technical challenges that can be addressed by the network of proxies in order for the system to be viable. For example, the proxies can identify the data associated with each transaction, determine a location of the data which in this example is in a different jurisdiction (source jurisdiction) which is geographically different than the target jurisdiction and which is subject to different regulatory constraints than the target jurisdiction. The proxies can determine the policies that must be enforced depending upon the location of the data. Furthermore, the policies may provide a low latency response to transaction requests.

In the example of FIG. 2B, a proxy 412 sits in front of the target database 410 and identifies a location of the data needed by the software application. For example, the data requirements of the transaction can be specified in data structures associated with each transaction type which are held in a policy database 414 that may be included in or separate from the target database 410. These data structures can be defined by knowledgeable humans or they can be learned by observing the data access patterns of the processing system for transactions of each particular type. Alternatively, they can be derived from logs of the history of prior transactions. When a request arrives at the target database 410, it will specify its point of origin and the transaction that is required. For the credit card example, consider that a request will be sent from the source jurisdiction to the target jurisdiction identifying the credit card number and indicating that authorization is required for a sale of a certain amount.

Referring to FIG. 4B, a process 400B of querying the source jurisdiction for the necessary data is shown. Here, the target database 410 and/or the policy database 414 will maintain information regarding the location of the data for every person for whom transactions can be executed, e.g., the credit card holders. This information may indicate, for example, the credit card number and the address of the site associated with that number, i.e., the address of the site at which the personal data is stored. This information is given to all of the database proxies at the processing site. These proxies have access to information identifying their associated proxies at the remote site that mediate access to the equivalent databases, i.e., databases with the same schema holding data of the same type as would be stored locally. Note that the proxies may also be used to map the schema of the local database to that of the remote database if their schemas are not identical. This would be necessary if the different countries chose to store their information in different ways.

When the software application 420 running on the processing site (coupled to target database 410) in target jurisdiction requests data from the source database 430, the proxy 412 can mediate access to the source database 430 and send a request for that information to the address of a proxy 432 of the source database 430 located in the source jurisdiction that mediates access to the source database 430 actually storing the data. In this way, the proxy 412 and the proxy 432 create a layer of proxies in between the target database 410 and the source database 430 and which enforce all regulatory requirements of the source jurisdiction in the target jurisdiction. It is assumed that every application involved in a transaction would need to send information identifying that transaction for which the data is being requested to the local databases in order to obtain the appropriate data. That information is used by the local proxies to identify their correct counterparts for each transaction executed.

As an example, the data being requested by the software application 420 may be data that is located in a country of citizenship of an individual for whom the software application 420 is executing a transaction, e.g., credit card holder. The policies that govern the handling of data may be determined from the regulations that pertain to the particular country in which the databases holding the personal data reside. The regulations may not be specified in terms of the actual contents or schema of the databases, rather they are specified in terms of abstract higher-level concepts in regulatory language. FIG. 4C illustrates a process 400C of retrieving the data from the source database 430. Referring now to FIG. 4C, the proxy 432 may retrieve the requested data from the source database 430 based on any regulatory constraints of the source jurisdiction and return the data to the proxy 412 in the target jurisdiction. The transfer may be a temporary transfer as a result of the regulatory requirements of the source jurisdiction.

The regulatory documents can be analyzed to extract the entities embodying the concepts that are specified in the regulations. Once the entities have been identified from parsing of the regulations, the statements in the documents can be converted to rules that express the constraints imposed. For example, if data can only be transferred for 24 hours (on a temporary basis), the rule can be expressed as an if-else statement that says if the amount of time the data has been held is less than 24 hours then hold the data, but if the data has been held for at least 24 hours, purge the data. The structure of the regulations would tend to follow common patterns addressing such issues as data movement, location, retention, etc. These can be captured in templates that can be used to extract the rules. These templates can be learned by parsing the structure of the regulations to generate potential rule syntaxes which can then be refined by knowledgeable humans.

Figure 4D:
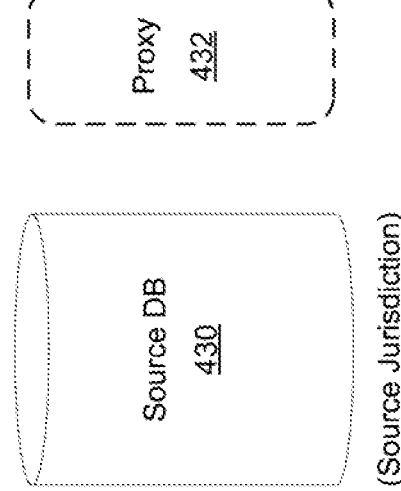

FIG. 4D illustrates a process 400D of executing a data transaction based on the data retrieved from the source jurisdiction. Referring now to FIG. 4D, the data returned from the source database 430 to the proxy 412 in the target jurisdiction may be coupled with any necessary data from the target database 410 and delivered to the software application 420 via the proxy 412. In response, the software application 420 may process the transaction based on the data from the source database 430 and generate a processing result. For example, the software application 420 may process a financial transaction via an electronic payment network.

Figure 4E:
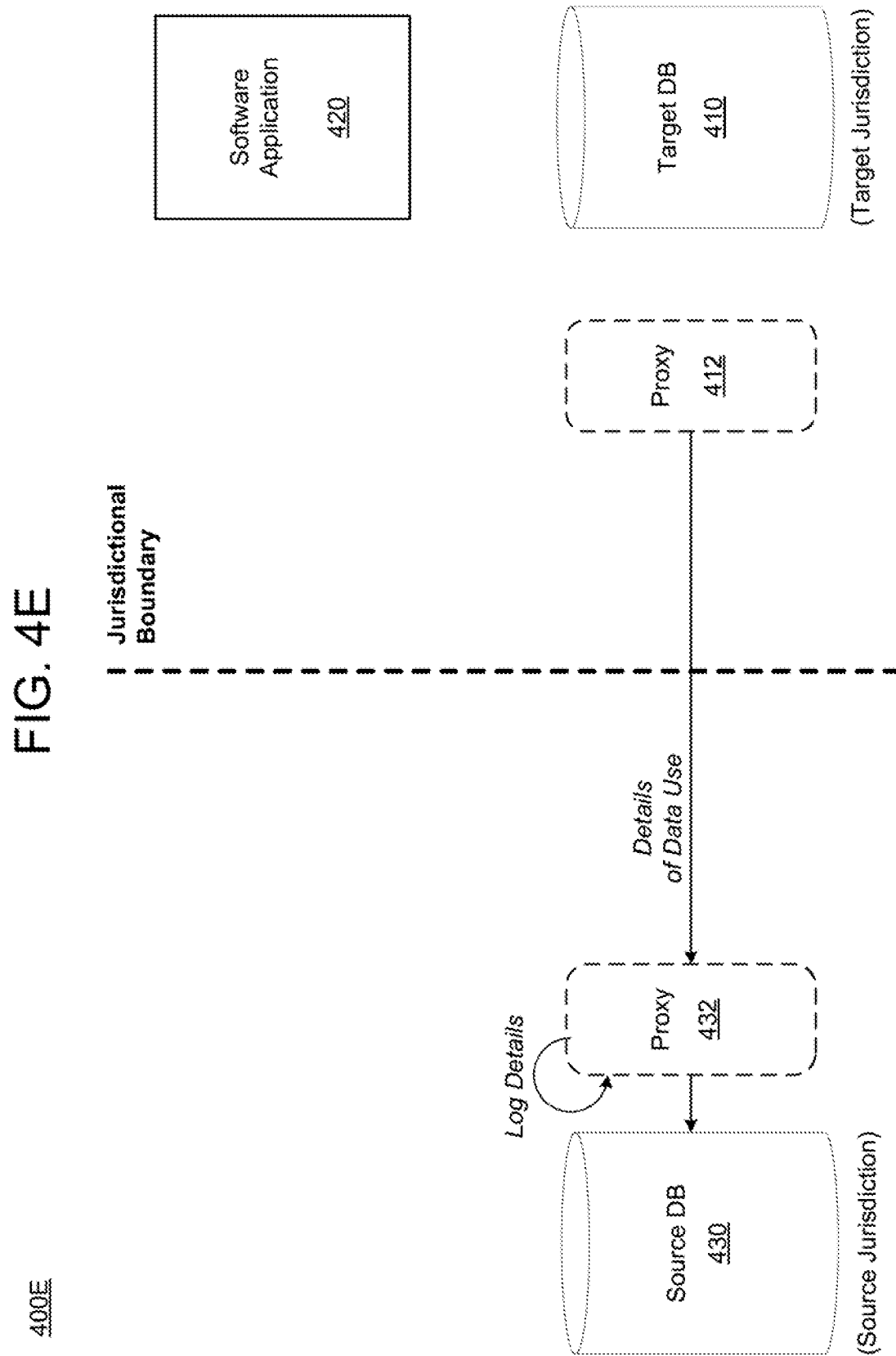

FIG. 4E illustrates a process 400E of executing additional actions to satisfy regulatory compliance. Referring to FIG. 4E, the regulatory requirements of the source jurisdiction require the data transferred to the target jurisdiction to be deleted after 24 hours and it also requires a log of how the data was used to be recorded back in the source jurisdiction. In FIG. 4E, the proxy 412 can generate a log of the use of the data from the source database 430 include an identifier of any payment transactions, the user, the transaction details, a timestamp, a date, and the like, of the transaction execution. The proxy 412 can forward the logged data to the proxy 432 which can record the logged data of how the data was used in the source jurisdiction, such as a log file stored in the source database 430.

Figure 4F:
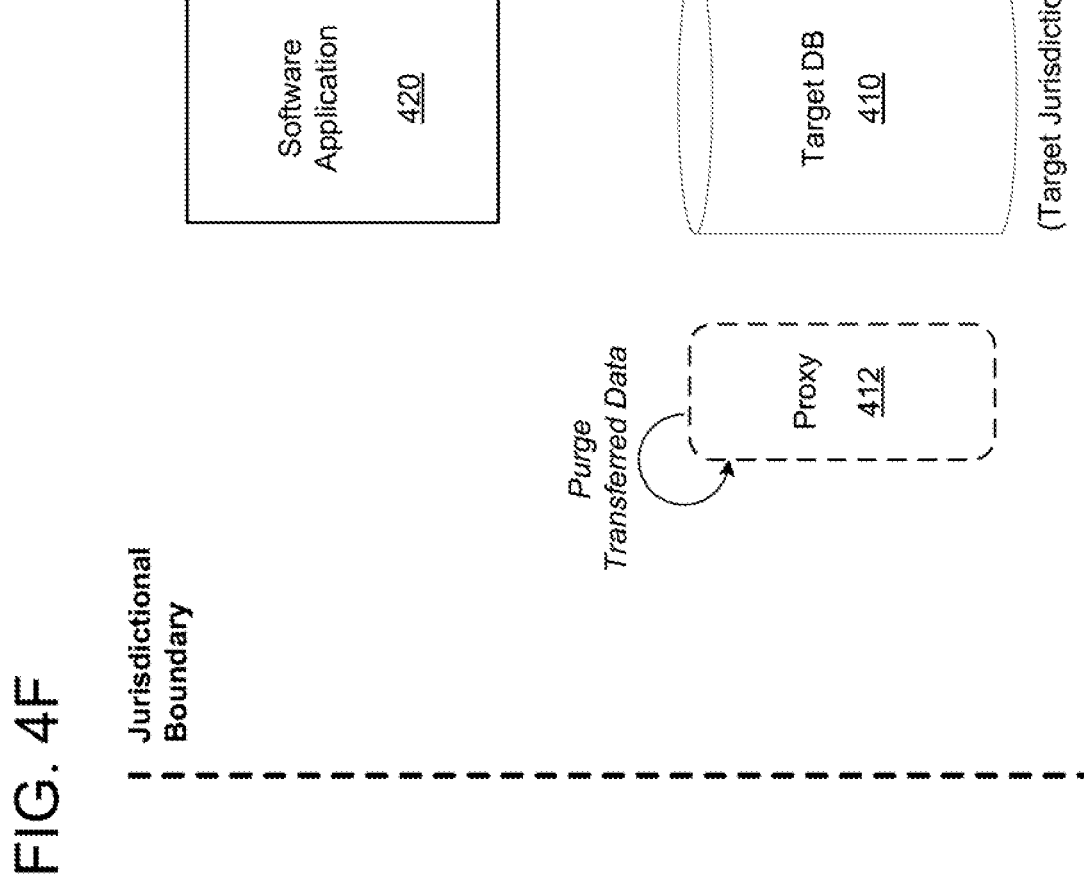

FIG. 4F illustrates a process 400F of executing additional actions to satisfy regulatory compliance. Referring to FIG. 4F, the proxy 412 determines that the temporary period of time for holding the data from the source jurisdiction has reached an end of its time period and purge/delete the data from the target database 410 and/or the proxy 412 thereby destroying the data in the target jurisdiction and enforcing the regulatory requirements of the source jurisdiction.

In the example embodiments, a system of interconnected database proxies permit applications coupled thereto to execute transactions as if all the transaction data were local, so that the applications need not be modified. However, this means that the applications were not written to accommodate changes in the times needed to access data. The increase in latency resulting from remote access will affect the execution times of the transactions.

In order to reduce this effect, the database proxies can engage in prefetching of data to improve read operations. This may be done in various ways. The data requirements of each transaction type may be determined a priori and stored in local data structures. When a database access request is made to a given proxy for a particular transaction, it can check whether the data in question needs to be fetched from its remote counterpart or whether it has already been prefetched. The first proxy to determine that the data needed for a particular transaction is remote would instruct all the other proxies to prefetch the data for which they mediate and store it locally in anticipation of its use. In this way, essentially only one data access would need to be remote.

Alternatively, a software module could be introduced at the processing site that would interpret the incoming transaction requests and determine the data needs of the transactions. This module could prefetch all the data from the remote site and store it locally. Further, if all requests coming from a given country are routed through a common gateway for that country, the data needs of the transactions could be determined at the gateway site, and a software module there could initiate the prefetching of data. This would be the most efficient if the request came from the same country as that in which the data resides. Otherwise, the gateway would need to be able to determine the location of the data and request the gateway at that site to initiate a prefetch operation.

Additionally, the history of transaction requests could be analyzed to predict what transaction requests might be expected involving a particular individual. If a person is shopping, for example, that person would be expected to use their credit card more than once, so relevant data could be held for a longer period of time if the applicable regulations permit. In order to preserve a reasonable level of synchronization between the remote databases and their counterparts at the processing center, the latency of Write operations needs also to be considered. The proxies can respond optimistically and update the remote databases without waiting for the transactions to complete. When the transaction terminates, all the relevant data could be written back, and the local data purged within the period of time specified by the appropriate regulations.

FIG. 5 illustrates a method of providing a dynamic view of a debugging state of a software system according to example embodiments. For example, the method may be performed by a container engine hosted on a cloud platform or other host system such as a web server, a database, a distributed network of systems, and the like. Referring to FIG. 5, in 510, the method may include receiving, via a proxy located in a first geographic jurisdiction, a request for data from a software program, wherein the data is stored in a database located in a second geographic jurisdiction.

In 520, the method may include identifying a regulatory constraint that must be enforced on the data stored in the database in the second geographic jurisdiction based on a policy associated with the second geographic jurisdiction. In 530, the method may include retrieving, via the proxy in the first geographic jurisdiction, the data requested from a proxy located in the second geographic jurisdiction. In 540, the method may include delivering the data received from the proxy located in the second geographic jurisdiction to the software program. In 550 the method may include executing, via the proxy in the first geographic jurisdiction, an additional action on the data to comply with the regulatory constraint of the second geographic jurisdiction.

In some embodiments, the identifying may include identifying the second geographic jurisdiction from a location of origin value included in the request and identifying a regulatory policy which is mapped to the location of origin value in a data store of the proxy in the first geographic jurisdiction. In some embodiments, the method may further include receiving notification of the data to be transferred prior to receiving the request from the software program, and in response to the notification, and transmitting a call to the proxy located in the second geographic jurisdiction with instructions to pre-fetch the data from the database. In some embodiments, the retrieving may include checking whether the data has been prefetched from the proxy located in the second geographic jurisdiction prior to retrieving the data from the proxy located in the second geographic jurisdiction.

In some embodiments, the method may further include identifying a recurring transaction request from the software program based on a transaction history of the software program. In some embodiments, the method may further include identifying data used by the recurring transaction request, which is located in a third geographic jurisdiction, predicting a next occurrence of the recurring transaction request, and transmitting a call to a proxy located in the third geographic jurisdiction with instructions to pre-fetch the data from a database located in the third geographic jurisdiction prior to the predicted next occurrence.

In some embodiments, the executing may include transferring a log of how the data was used by the software program in the first geographic jurisdiction to the proxy located in the second geographic jurisdiction for storage in a log in the database in the second geographic jurisdiction. In some embodiments, the executing may include purging the data from the database located in the first geographic jurisdiction via the proxy located in the first geographic jurisdiction after a predetermined period of time specified by the regulatory constraint has elapsed.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example system 600, which may represent or be integrated in any of the above-described components, etc.

Figure 6:
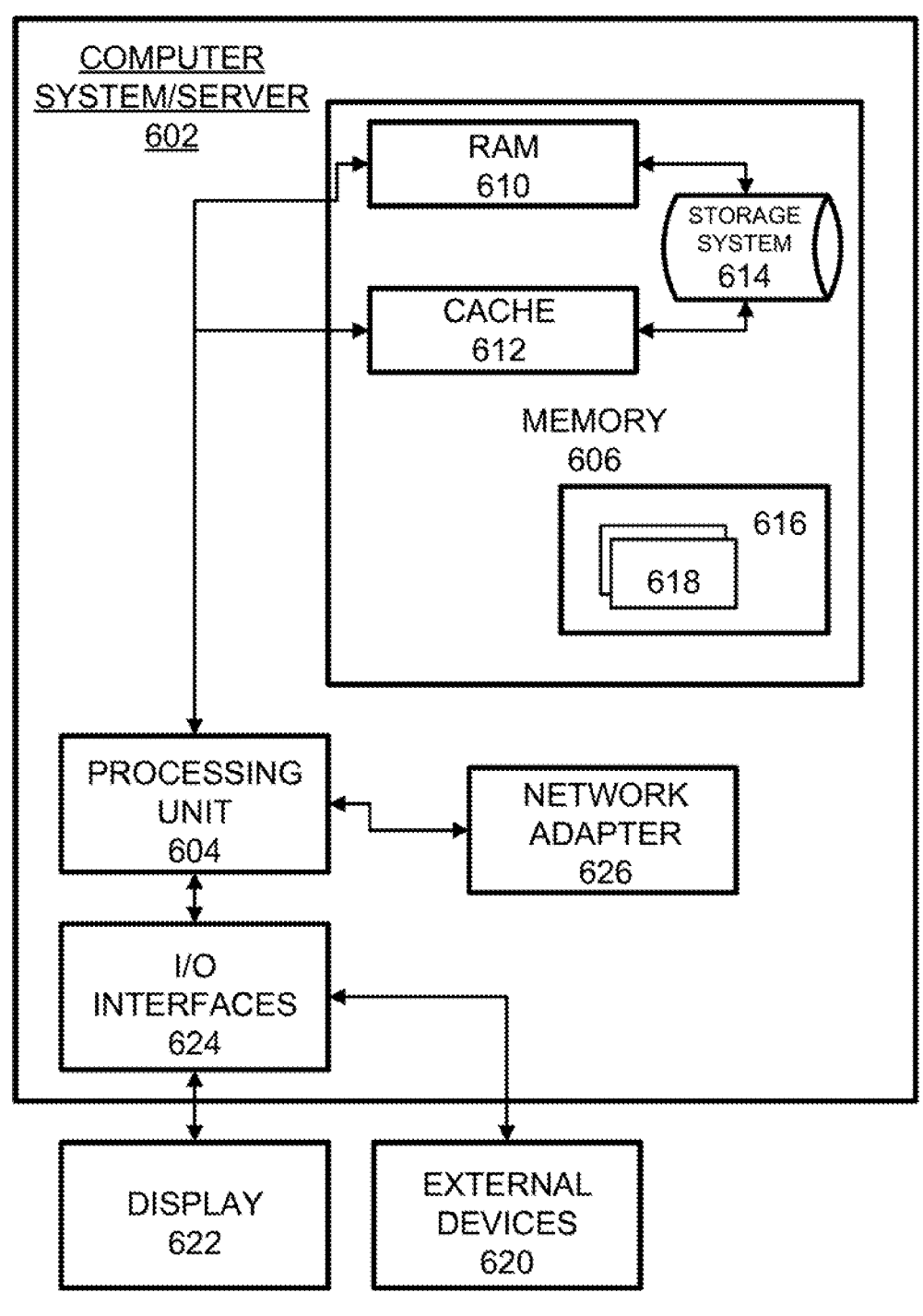
FIG. 6 is a diagram illustrating an example system that supports one or more of the example embodiments described herein.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 6, computer system/server 602 in system 600 is shown in the form of a general-purpose computing device. The components of computer system/server 602 may include, but are not limited to, one or more processors or processing units 604, a system memory 606, and a bus that couples various system components, including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof may include an implementation of a networking environment. Program modules 618 generally carry out the functions and/or methodologies of various application embodiments as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to: microcode, device drivers, redundant processing units, external disk drive arrays, RAID systems, tape drives, data archival storage systems, etc.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:

a processor set;

one or more computer-readable storage media; and program instructions stored on the one or more computer-readable storage media to cause the processor set to perform operations comprising:

receiving, via a proxy located in a first geographic jurisdiction, a request for data from a software program, wherein the data is stored in a database located in a second geographic jurisdiction;

identifying a regulatory constraint that must be enforced on the data stored in the database in the second geographic jurisdiction based on a policy associated with the second geographic jurisdiction, wherein the identifying comprises identifying the second geographic jurisdiction from a location of origin value included in the request and identifying a regulatory policy which is mapped to the location of origin value in a data store of the proxy in the first geographic jurisdiction;

retrieving, via the proxy in the first geographic jurisdiction, the data requested from a proxy located in the second geographic jurisdiction;

delivering the data received from the proxy located in the second geographic jurisdiction to the software program; and executing, via the proxy in the first geographic jurisdiction, an additional action on the data to comply with the regulatory constraint of the second geographic jurisdiction.

2. The apparatus of claim 1, wherein the operations further comprise receiving a notification of the data to be transferred prior to receiving the request from the software program, and in response to the notification, transmitting a call to the proxy located in the second geographic jurisdiction with instructions to pre-fetch the data from the database.

3. The apparatus of claim 1, wherein the operations further comprise checking whether the data has been prefetched from the proxy located in the second geographic jurisdiction prior to retrieving the data from the proxy located in the second geographic jurisdiction.

4. The apparatus of claim 1, wherein the operations further comprise identifying a recurring transaction request from the software program based on a transaction history of the software program.

5. The apparatus of claim 4, wherein the operations further comprise identifying data used by the recurring transaction request which is located in a third geographic jurisdiction, predicting a next occurrence of the recurring transaction request, and transmitting a call to a proxy located in the third geographic jurisdiction with instructions to pre-fetch the data from a database located in the third geographic jurisdiction prior to the predicted next occurrence.

6. The apparatus of claim 1, wherein the operations further comprise transferring a log of how the data was used by the software program in the first geographic jurisdiction to the proxy located in the second geographic jurisdiction for storage in a log in the database in the second geographic jurisdiction.

7. The apparatus of claim 1, wherein the operations further comprise purging the data from the database located in the first geographic jurisdiction via the proxy located in the first geographic jurisdiction after a predetermined period of time specified by the regulatory constraint has elapsed.

8. A method comprising:

receiving, via a proxy located in a first geographic jurisdiction, a request for data from a software program, wherein the data is stored in a database located in a second geographic jurisdiction;

identifying a regulatory constraint that must be enforced on the data stored in the database in the second geographic jurisdiction based on a policy associated with the second geographic jurisdiction, wherein the identifying comprises identifying the second geographic jurisdiction from a location of origin value included in the request and identifying a regulatory policy which is mapped to the location of origin value in a data store of the proxy in the first geographic jurisdiction;

retrieving, via the proxy in the first geographic jurisdiction, the data requested from a proxy located in the second geographic jurisdiction;

delivering the data received from the proxy located in the second geographic jurisdiction to the software program; and executing, via the proxy in the first geographic jurisdiction, an additional action on the data to comply with the regulatory constraint of the second geographic jurisdiction.

9. The method of claim 8, wherein the method further comprises; receiving notification of the data to be transferred prior to receiving the request from the software program, and in response to the notification, and transmitting a call to the proxy located in the second geographic jurisdiction with instructions to pre-fetch the data from the database.

10. The method of claim 8, wherein the retrieving comprises checking whether the data has been prefetched from the proxy located in the second geographic jurisdiction prior to retrieving the data from the proxy located in the second geographic jurisdiction.

11. The method of claim 8, wherein the method further comprises: identifying a recurring transaction request from the software program based on a transaction history of the software program.

12. The method of claim 11, wherein the method further comprises: identifying data used by the recurring transaction request which is located in a third geographic jurisdiction, predicting a next occurrence of the recurring transaction request, and transmitting a call to a proxy located in the third geographic jurisdiction with instructions to pre-fetch the data from a database located in the third geographic jurisdiction prior to the predicted next occurrence.

13. The method of claim 8, wherein the executing comprises transferring a log of how the data was used by the software program in the first geographic jurisdiction to the proxy located in the second geographic jurisdiction for storage in a log in the database in the second geographic jurisdiction.

14. The method of claim 8, wherein the executing comprises purging the data from the database located in the first geographic jurisdiction via the proxy located in the first geographic jurisdiction after a predetermined period of time specified by the regulatory constraint has elapsed.

15. A computer program product comprising:
one or more computer-readable storage media; and
program instructions stored on the one or more computer-readable storage media, that when read by a processor, cause the processor to perform operations comprising:
receiving, via a proxy located in a first geographic jurisdiction, a request for data from a software program, wherein the data is stored in a database located in a second geographic jurisdiction;
identifying a regulatory constraint that must be enforced on the data stored in the database in the second geographic jurisdiction based on a policy associated with the second geographic jurisdiction, wherein the identifying comprises identifying the second geographic jurisdiction from a location of origin value included in the request and identifying a regulatory policy which is mapped to the location of origin value in a data store of the proxy in the first geographic jurisdiction;
retrieving, via the proxy in the first geographic jurisdiction, the data requested from a proxy located in the second geographic jurisdiction;
delivering the data received from the proxy located in the second geographic jurisdiction to the software program; and
executing, via the proxy in the first geographic jurisdiction, an additional action on the data to comply with the regulatory constraint of the second geographic jurisdiction.

16. The computer program product of claim 15, wherein the operations further comprise: receiving notification of the data to be transferred prior to receiving the request from the software program, and in response to the notification, transmitting a call to the proxy located in the second geographic jurisdiction with instructions to pre-fetch the data from the database.

17. The computer program product of claim 15, wherein the retrieving comprises checking whether the data has been prefetched from the proxy located in the second geographic jurisdiction prior to retrieving the data from the proxy located in the second geographic jurisdiction.

18. The computer program product of claim 15, wherein the operations further comprise:
identifying a recurring transaction request from the software program based on a transaction history of the software program;
identifying data used by the recurring transaction request which is located in a third geographic jurisdiction;
predicting a next occurrence of the recurring transaction request; and
transmitting a call to a proxy located in the third geographic jurisdiction with instructions to pre-fetch the data from a database located in the third geographic jurisdiction prior to the predicted next occurrence.

19. The computer program product of claim 15, wherein the executing comprises transferring a log of how the data was used by the software program in the first geographic jurisdiction to the proxy located in the second geographic jurisdiction for storage in a log in the database in the second geographic jurisdiction.

20. The computer program product of claim 15, wherein the executing comprises purging the data from the database located in the first geographic jurisdiction via the proxy located in the first geographic jurisdiction after a predetermined period of time specified by the regulatory constraint has elapsed.

* * * * *